United States Patent

[11] 3,630,626

[72] Inventor Jean-Michel Rouberol
         Courbevoie, France
[21] Appl. No. 53,517
[22] Filed July 9, 1970
[45] Patented Dec. 28, 1971
[73] Assignee Compagnie d'Applications Mecaniques a
         L'Electronique, Au Cinema et a
         L'Atomistique (c.A.M.E.C.A.)
[32] Priority July 21, 1969
[33] France
[31] 6924740

[54] TWO-CHANNEL INFRARED SPECTROMETER
     WITH PIVOTING COLLIMATOR
     4 Claims, 4 Drawing Figs.
[52] U.S. Cl....................................................... 356/95,
                                    250/43.5, 356/51, 356/97
[51] Int. Cl....................................................... G01j 3/42,
                                                         G01n 21/34

[50] Field of Search........................................... 356/88, 95,
                                    99, 100, 51; 250/43.5 R, 226

[56] References Cited
UNITED STATES PATENTS
3,349,241  10/1967  Schmitt et al.................  356/95

Primary Examiner—Ronald L. Wibert
Assistant Examiner—J. P. McGraw
Attorney—Kurt Kelman ABSTRACT: In an infrared spectrometer with two channels preceded by a device for producing monochromatic radiation and constituted by a collimator, a diffraction grating and a focusing element, the collimator can adopt two angular rest positions by pivoting about an axis perpendicular to the lines of the grating; in these two positions of the collimator, the focusing element directs a monochromatic beam whose wavelength depends solely upon the position of the grating, either onto a first slot or onto a second slot, those slots being respectively coupled to the two channels.

INVENTOR
JEAN-MICHEL ROUBEROL

BY Kurt Kelman

AGENT

TWO-CHANNEL INFRARED SPECTROMETER WITH PIVOTING COLLIMATOR

The present invention relates to an improvement in two-channel infrared spectrometers.

Those skilled in the art will appreciate that in these spectrometers the radiation intensities transmitted at a given wavelength (in practice, a wavelength falling within the very narrow interval of wavelengths which can be picked out by means of a wavelength selector or "monochromalizer" by two channels, one of which contains the sample to be studied and the other being a reference channel, these two channels being alternately supplied, by means of an optical switch, with a beam issued from a radiation source.

One of the chief problems in these spectrometers is of course the avoidance of any lack of balance between the effective powers supplied to the two channels, and also of any influence of parasitic radiation.

The chief causes at work in this context are as follows:

I. moving components having two positions respectively corresponding to the times of transmission through the two channels;
II. heating of the specimen or sample;
III. nonuniformity in the luminous flux from different points on the emissive source.
  a. It is known to place all the moving components before the wavelength selector, and this substantially eliminates the first cause.
  b. It is known to place the wavelength selector before the two channels, which substantially eliminates the second cause.
  c. Finally, it is known to supply the two channels with two beams which are derived in identical manners as far as their flux is concerned (but not of course in terms of their trajectories), from the same original beam emitted by a given part of the emissive surface of the source, and this inhibits the third cause. The corresponding spectrometers will be referred to as being of the single original beam type, the others being referred to as twin original beam types. Twin (original) beam spectrometers are known which satisfy either exclusively the condition a or exclusively the condition b, or both at once, but of course not condition c.

Single (original) beam spectrometers are known which satisfy either condition a or condition b.

The object of the present invention is a single original beam infrared spectrometer which has the advantage of simultaneously satisfying condition b and a condition a' which as far as its result is concerned is equivalent to the condition a (all the moving components precede the diffraction grating of the device producing the monochromatic radiation), as well as other desirable characteristics. This result is obtained through using the collimator of the wavelength selector as the moving part of the optical switch.

In accordance with the invention, there is provided an infrared spectrometer comprising: a radiation source having an emissive surface; a wavelength selector for producing substantially monochromatic radiation, said wavelength selector comprising a collimator element, a diffraction grating orientable by rotation about an axis parallel to the lines of the diffraction grating, and a focusing element; first and second optical channels; a detector; first means for directing onto the collimator of said wavelength selector a single beam issuing from a predetermined part of said emissive surface of said source; second means for orientating said collimator in accordance with a first or a second fixed rest position, each of which is derived from the other by rotation about an axis perpendicular to the lines of the diffraction grating, so as to direct, selectively onto said first channel or onto said second channel, the beam of substantially monochromatic radiation focused by said focusing element; and third means for directing onto the detector the exit beams from the two channels.

The invention will be better understood and other of its features rendered apparent, from a consideration of the ensuing description and the related drawings in which.

Figure 1:
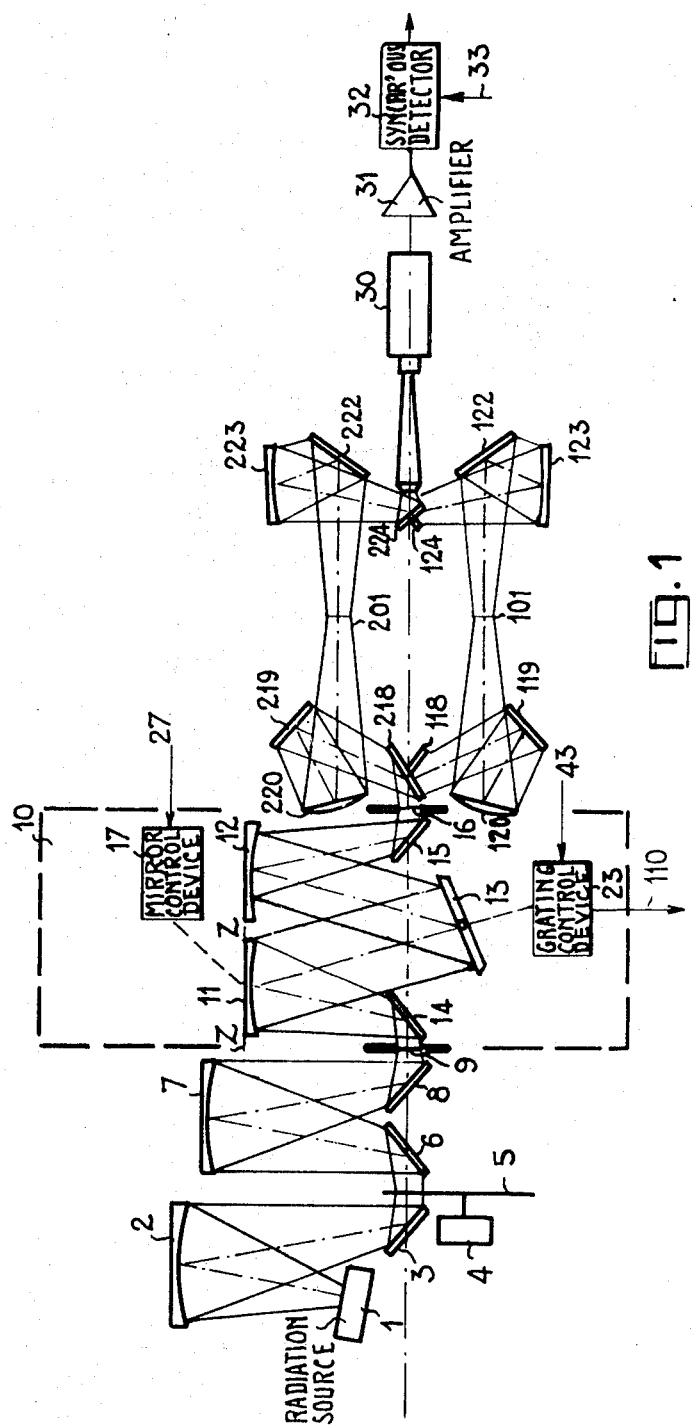
FIG. 1 is the diagram of an embodiment of a spectrometer in accordance with the invention.

In FIG. 1, which represents the center plane of the spectrometer, the radiation omitted by a source 1 is received by a convergent mirror 2 which reflects it onto the first element 3 of a low-pass filter. This element 3 can be a mat-finish mirror or a diffraction grating operated in the zero order mode, which reflects the lower frequencies of the incident spectrum, and eliminates by diffusion the higher frequencies thereof.

The element 3 reflects the useful light onto an identical element 6 which in turn reflects it onto a convergent mirror 7. The radiation reflected by the mirror 7 is reflected by a flat mirror 8 onto a slot 9 located at the position of the image, produced by the preceding optical system, of the effective part of the emissive surface of the source which part will referred to hereinafter as the "effective source."

The low-pass filtering is designed to exclude parasitic radiation fractions due to multiple order diffractions at the diffraction grating of the monochromatizer.

Between the elements 3 and 6 of the low-pass filter device, a disc 5 is arranged which contains one or more holes and is driven by a motor 4 in order to produce all or nothing modulation (chopping) of the incident beam, so that a detector can be used such as a Golay cell, which only responds to an alternating signal. The holes in the disc 5 are arranged in order to periodically bracket the image of the effective source produced by the element 3.

The foregoing arrangements are conventional in nature.

When it has passed through the slot 9, which is the entry slot of the monochromatizer, the beam is reflected by a flat mirror 14 which directs it onto the collimator mirror 11 of a monochromatizer 10, creating a new image, this time a virtual one, of the effective source, this new image being located in the focal plane of the collimator 11.

The monochromatizer in accordance with the invention is a derivative of the Czerny-Turner monochromatizer.

The latter contains, in addition to the collimating mirror, a diffraction grating which receives the beam of parallel rays reflected by the collimator, as well as a mirror identical to the mirror 11 which focuses onto an exit slot the radiation diffracted by the grating in a given direction.

In order to select the wavelength, the position of the grid is adjusted by rotation about an axis parallel to the grating lines.

The monochromatizer in accordance with the invention, similarly, incorporates in addition to the collimator 11, a diffraction grating 13 whose position is adjustable in the same fashion, and a convergent mirror 12.

However, in the monochromatizer in accordance with the invention, the collimator 11 can pivot under the control of a motor 17, about the axis $zz$ defined by the intersection of the tangent plane to its apex, with the supposedly horizontal plane of the figure, in order for it to be able to adopt two terminal positions which we will term rest positions, in which the plane tangent to its apex respectively makes two equal and opposite angles $\epsilon$ and $-\epsilon$ with the vertical plane passing through $zz$. These rocking movements or swings can be brought about by an electromechanical device symbolized by the block 17 which includes a mechanical connection to the mirror and an electrical control input 27.

The convergent mirror 12 thus, for a selected wavelength and respectively for these two positions of the collimator 11, gives two diffraction images of the effective source, situated one below the other relatively to the plane of the figure.

The angular displacement of the diffraction grating 13 can be produced electrically, the grating being assembled on a mounting whose spindle is driven by a motor through the medium of stepdown gearing. For the purposes of automatic recording of the spectrum, a pickup potentiometer is associated with the motor in order to produce a signal which is a function of the position of the diffraction grating.

A device of this kind has been indicated symbolically by the block 23 which has a mechanical connection with the rotation axis of the grating, an electrical control input of the motor 43, and the output 110 of the pickup potentiometer.

A mirror 15, in the same way as the mirror 14, is provided simply in order to facilitate the positioning of the various parts of the apparatus, by deflecting the reflected beams from the convergent mirror 12 and correspondingly displacing the two aforesaid diffraction images.

The two exit slots 116 and 216 of the monochromatizer, respectively surround the two diffraction images which are produced, for the selected wavelength, by the mirror 15.

In FIG. 1, these two exit slots, which are not visible in the center plane of the spectrometer, have been replaced by their common projection 16 onto the plane of the figure. The same has been done for the beams reflected by the mirrors 12 and 15, respectively for the two positions of the mirror 11.

When the exit beam from the monochromatizer is directed onto the upper slot 216, it is successively reflected by a flat mirror 218, a flat mirror 219 and a convergent mirror 220 which directs it through the sample or specimen channel; the latter is simply illustrated by the contour of the beam which passes through it and this beam produces, at 201, an image of the effective source, in the region of which the sample will be disposed.

The exit beam from the sample channel is incident upon a flat mirror 222 which directs it onto a convergent mirror 223. The radiation from the mirror 223 is reflected by the flat mirror 224 onto the detector 30.

When the exit beam from the monochromatizer is directed onto the lower slot 116, it is conducted through the references channel by means of an optical device similar to that hereinbefore described, whose elements have been marked by numbers which are lower by 100 than those designating the corresponding elements of said sample channel in the previous case.

The mirrors 118 and 124, respectively located below the mirror 218 and 224, have been illustrated only partially, simply in order to avoid overburdening the drawing.

The detector 30 produces a pulsed electrical signal proportional to the intensity of the radiation which it receives, and is followed by an amplifier 31 plus a synchronous detector 32, supplied at the input 33 with a reference signal synchronized with the rotation of the modulator 5 by a conventional device which has not been shown.

Figure 2:
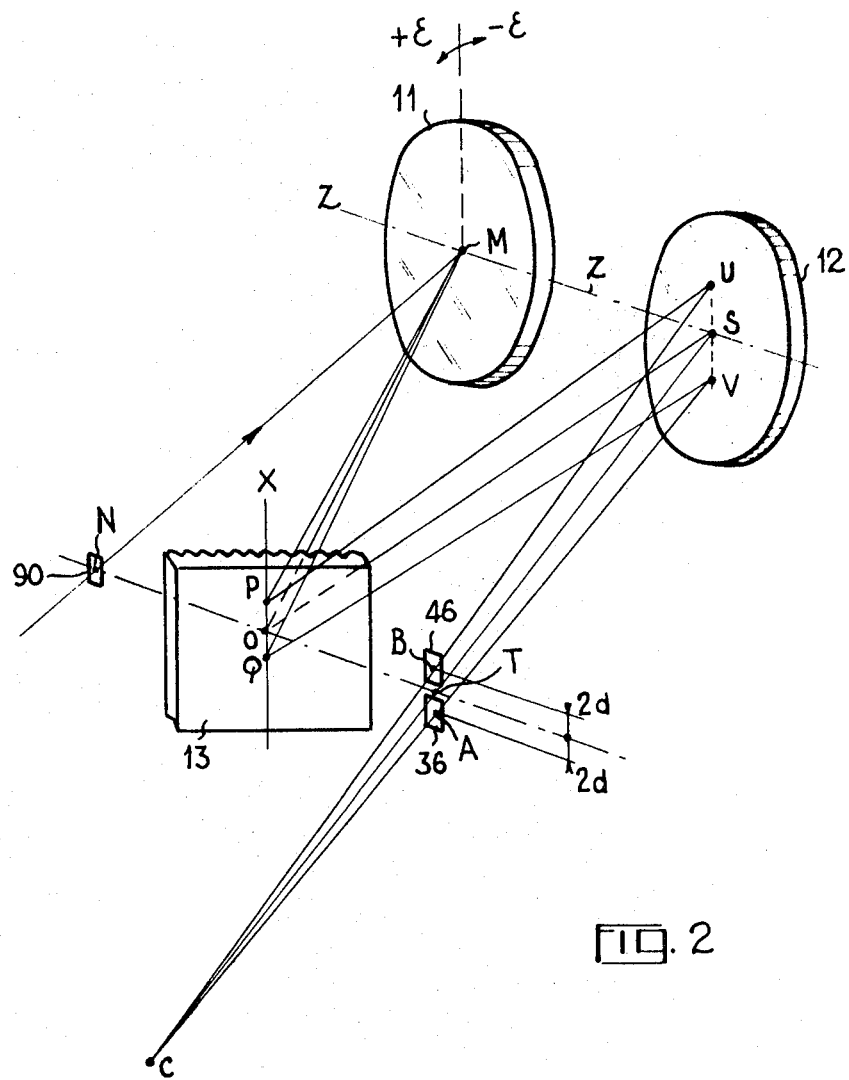
FIG. 2 illustrates a perspective view of the monochromatizer used in the spectrometer of FIG. 1.

FIG. 2 provides a perspective view of the optical elements of the monochromatizer 10 of FIG. 1, similar elements being marked by similar reference numbers.

In order to avoid unnecessary complication of the drawing, however, the mirrors 14 and 15 have been discarded and the slot 9 replaced by a slot 90 whose center N occupies the location of the virtual image of the slot 9 produced by the mirror 14, while the slots 116 and 216 have been replaced by two slots 36 and 46 whose respective centers A and B respectively occupy the locations of the virtual images of the slots 116 and 216 which would be produced by the mirror 15 with appropriate illumination of these slots.

This does not of course in any way modify the operation of the monochromatizer.

The collimator mirror 11, of apex M, is for example a spherical mirror of radius R so that its focal distance is consequently $F=R/2$.

The mirror 12, of apex S, is identical to it, and the focal planes of the two mirrors are coincidental with one another, the straight line MS thus being parallel to said common focal plane in which the lanes of the slots 90, 36 and 46 are also located.

The point T is the middle point of AB.

The straight line NT is parallel to MS, NT and MS defining a plane H which will be assumed to be horizontal. The tangent plane at S, to the mirror 12, is vertical. The same applies to the plane which is tangential at M to the mirror 11, when the latter occupies the center position intermediate of its two rest positions.

The grating 13 has its lines vertically disposed.

Its center is located at the point 0 situated on the straight line NT, which point will be discussed in more detail hereinafter. The grating is mobile about a vertical axis OX, its angular position being defined by the angle $\theta$ made between the straight line NT and the macroscopic plane of the grating.

In order to simplify the language and the drawing, the operation of the system will be explained purely in terms of the center ray of the beams which are successively considered.

Assuming first of all that the mirror 11 is in an angular position such that the plane tangential to its apex is vertical, the center ray NM of the entry beam will be reflected onto the grating and be incident thereon at a point located on its line of intersection with the plane H.

If the mirror is pivoted through a small angle $+\epsilon$ so that its upper part is inclined forward, the ray NM will be reflected in the form of a ray incident upon the grating at a point Q whose vertical passes through the plane H at 0, the location of the point 0 being precisely chosen to this end as a function of $\epsilon$.

The straight line MQ is not normal to the lines of the grating. If $\beta$ designates the angle made between MQ and the vertical, the directions of maximum intensity of the diffracted rays will occur on that of the two cones of axis QO and apex half-angle $\beta$, which does not contain QM.

The axial half-plane QS intersects said cone along a generatrix QV which meets the mirror 12 at V and constitutes the center ray of a diffracted beam of wavelength $\lambda(\theta)$ which is a function of the angular position $\theta$ of the grating.

The point V thus defined has a position which is independent of the angular position $\theta$ of the grating.

If, now, the collimator 11 is pivoted through an angle $-\epsilon$, because of the symmetry in relation to the plane H the collimator 11 will reflect the ray NM over the straight line MP, P being symmetrical to Q in relation to 0, in other words the line PQ contains QO.

Again, because of the symmetry, and U being that point on the mirror 12 which is symmetrical to V in relation to the plane H, PU constitutes the center ray of a diffracted beam of the same wavelength $\lambda(\theta)$ as before, since the lines of the grating 13 are likewise symmetrical in relation to the plane H.

For an angular position $\theta$ of the grating, the mirror 12 will therefore produce in its focal plane two monochromatic images at he wavelength $\lambda(\theta)$, of the effective source, these images corresponding respectively to the two rest positions of the collimator 11 and these two images accordingly occupying symmetrical positions in relation to the plane H.

The straight line PQ has been selected as the axis of rotation of the grating 13 so that the foregoing results remain valid whatever the angular position of the grating when in use.

The slots 36 and 46 are located in such a fashion as to respectively surround the two aforementioned monochromatic images.

For correct utilization of the mirrors 11 and 12, the angles NMO OST should not be too large, and they will preferably in fact be made less than 40°; as far as the angle $\epsilon$ is concerned, it will preferably be limited to some few degrees only.

Under these circumstances and under the supplementary condition of the example of FIG. 2, namely that PQ is in the focal plane of the mirrors, the distance $AB=2d$ between the centers of the slots 36 and 46 is substantially equal to $AB=4F\epsilon$, $\epsilon$ being expressed in radians and F being the focal length of the mirrors.

The same applies to the distance between the centers of the corresponding real slots.

It will be observed that the structure of the spectrometer described, besides simultaneously satisfying the conditions $a'$, $b$, $c$ hereinbefore indicated, makes it possible to virtually eliminate any possibility of parasitic radiation arriving at the detector.

In other words, any parasitic radiation emitted, or reflected by the mirror 11 and passing directly from said mirror to one or other of the exit slots, will necessarily be outside the effective beam and consequently will not arrive at the detector if (and this is something which is easy to contrive) at least one of the intermediate optical elements is arranged to limit the transverse section of the beam reaching the detector, to the transverse section of the useful beam.

Other parasitic rays cannot reach the detector unless mixed with the effective beam after having undergone zero order diffraction at the grating. This eventuality can be avoided by using one or more masks to prevent such rays reaching the grating.

Figure 3:
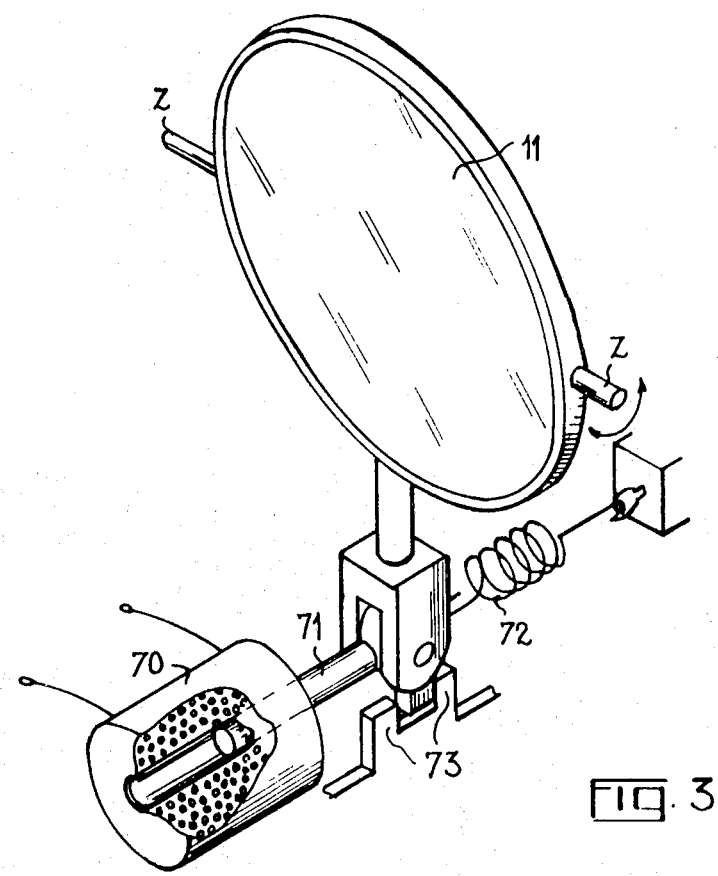
FIG. 3 illustrates an embodiment of the device for controlling the collimator of FIG. 1.

FIG. 3 illustrates a possible method of controlling the rocking of the collimator 11.

A core 70 has its moving armature 71 coupled to the mirror 11 and the displacement of this armature is limited by two stops 73 corresponding to the positions +ε and -ε of the collimator.

The coil of the solenoid is supplied, for example for the position +ε, with a signal of constant level, the position -ε being determined by the action of a spring 72 one end of which is coupled to the moving armature and the other to a fixed point.

Self-evidently, the spectrometer in accordance with the invention can be supplemented by the addition of an automatic device for recording the transmission spectrum of the sample.

It has been assumed in FIG. 1, that a spectrometer of this kind is intended to be operated in a manner in which the respective times of illumination of the two channels are long in relation to the modulation period, this being the case with the method and device proposed by Mathias Tong in his copending U.S. Pat. application Ser. No. 53,516 entitled "IMPROVEMENT IN INFRARED SPECTROMETERS," filed on July 9, 1970 and assigned to the present assignee.

A recording circuit not shown in FIG. 1 is then connected to the output of the synchronous detector and to the output 110 of the device 23 (FIG. 1).

In this case, the modulator and the optical switching device can be completely separate from one another and the reference signal applied to the synchronous detector 32 can simply be synchronized with the movement of the modulator.

There is no advantage in utilizing a modulator which is distinct from the optical switching device, if rapid switching between the channels is resorted to in order to obtain at the output of the synchronous detector, through appropriate design of the receiver, a signal which is proportional to the difference between the intensities transmitted by the two channels.

This is in particular the case in the classic zero method, where said signal is used to control a variable attenuator arranged in the reference channel, for example to control the displacement of a comb-type attenuator whose attenuation varies in accordance with the degree of penetration of the teeth of the comb into the beam.

The stylus of the recorder is thus controlled on the one hand, as before, as a function of the angular position of the grating, and on the other as a function of the translatory movement of the comb attenuator.

Figure 4:
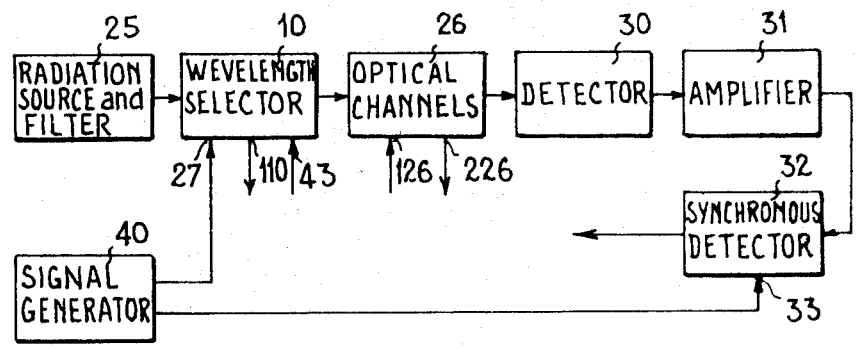
FIG. 4 illustrates a variant embodiment of the spectrometer of FIG. 1.

It is thus possible to use a variant embodiment of the spectrometer in accordance with the invention, which is shown in FIG. 4.

In this figure, the block 25 illustrates the elements preceding the monochromatizer 10, which elements are identical to the corresponding elements of the diagram of FIG. 1, except that the modulator has been discarded.

The block 26 illustrates the elements between the monochromatizer and the detector, which elements may again be identical to those of the spectrometer of FIG. 1, but for the fact that the comb attenuator is inserted in the reference channel and the conventional electromechanical device too (this comprising a motor which controls its displacement and a pickup potentiometer producing a signal which is a function of said displacement). The input 126 and the output 226 of the block 26 respectively represent the control input of the motor and the output of the pickup potentiometer.

The monochromatizer 10 has simply been illustrated by a block with the control inputs 43 and 27 (FIG. 1), controlling the angular position of the grating and the mirror 11 respectively, of the output 110 of the pickup potentiometer.

A signal generator 40 produces at a first output, pulses of mark time T/2 and spacing time T/2, which are applied to the input 27 of the monochromatizer 10 so that the collimator 11 adopts the angular position +ε during the mark periods and the angular position -ε during the space periods. It produces at a second output rectangular waveform signals of the same frequency but alternately presenting a positive peak during the mark periods of the aforesaid pulses, and a negative peak during the space periods; these rectangular waveform signals are applied to the input 33 of the synchronous detector 32. This brings us back to the classic case of double-channel spectrometers with automatic recording of the spectrum using a zero method, the output signals from the synchronous detector being employed after appropriate amplification to control the motor driving the comb attenuator.

Self-evidently, the invention is in no way limited to the embodiment described and illustrated here, and the spectrometer in accordance with the invention can be associated with other measurement or recording devices which users may require, by the introduction of modifications which are entirely within the scope of the person skilled in the art.

What is claimed is:

1. An infrared spectrometer comprising a radiation source having an emissive surface; a wavelength selector for producing substantially monochromatic radiation, said wavelength selector comprising a collimator element, a diffraction grating positioned for rotation about an axis parallel to the lines of the diffraction grating, and a focusing element; first and second optical channels; a detector; first means for directing onto the collimator of said wavelength selector a single beam issuing from a predetermined part of said emissive surface of said source; second means for orientating said collimator in accordance with a first or a second fixed rest position, each of which is derived from the other by rotation about an axis perpendicular to the lines of the diffraction grating, so as to direct, selectively onto said first channel or onto said second channel, the beam of substantially monochromatic radiation focused by said focusing element; and third means for directing onto the detector the exit beams from the two channels.

2. An infrared spectrometer as claimed in claim 1, wherein said collimator and focusing element are concave mirrors.

3. An infrared spectrometer as claimed in claim 1, comprising a mechanical modulator, whose movement is independent from that of said collimator element, for chopping said single beam.

4. An infrared spectrometer as claimed in claim 1, comprising a device for controlling said second means so as to cause said collimator to be rocked between its two rest positions at a fixed frequency.

* * * * *